(12) United States Patent
Tegeder et al.

(10) Patent No.: US 12,024,611 B2
(45) Date of Patent: Jul. 2, 2024

(54) CURABLE COMPOSITION COMPRISING POLYAZIRIDINE AND OXIDIZED BORON NITRIDE PARTICLES, METHOD OF CURING THE SAME, AND CURED COMPOSITION

(71) Applicant: 3M INNOVATIVE PROPERTIES COMPANY, St. Paul, MN (US)

(72) Inventors: Patricia J. Tegeder, Düsseldorf (DE); Martin Engler, Kempten (DE); Ricardo Mizoguchi Gorgoll, Sagamihara (JP); Jens Eichler, Kaarst (DE); Stefanie Wildhack, Kempten (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 18/279,003

(22) PCT Filed: Feb. 3, 2022

(86) PCT No.: PCT/IB2022/050957
§ 371 (c)(1),
(2) Date: Aug. 25, 2023

(87) PCT Pub. No.: WO2022/195363
PCT Pub. Date: Sep. 22, 2022

(65) Prior Publication Data
US 2024/0150548 A1 May 9, 2024

Related U.S. Application Data

(60) Provisional application No. 63/162,069, filed on Mar. 17, 2021.

(51) Int. Cl.
| | | |
|---|---|---|
| *C08K 3/38* | (2006.01) | |
| *C08G 65/333* | (2006.01) | |
| *C08G 77/46* | (2006.01) | |
| *C08K 9/02* | (2006.01) | |
| *C08L 71/02* | (2006.01) | |

(52) U.S. Cl.
CPC .......... *C08K 3/38* (2013.01); *C08G 65/33303* (2013.01); *C08G 77/46* (2013.01); *C08K 9/02* (2013.01); *C08L 71/02* (2013.01); *C08K 2003/385* (2013.01); *C08K 2201/014* (2013.01); *C08L 2203/20* (2013.01)

(58) Field of Classification Search
CPC ...... C08K 3/38; C08K 9/02; C08K 2003/385; C08K 2201/014; C08L 71/02; C08L 2203/20; C08G 65/33303; C08G 77/46
USPC ........................................................ 524/701
See application file for complete search history.

(56) References Cited

U.S. PATENT DOCUMENTS

| | | | |
|---|---|---|---|
| 5,086,148 | A | 2/1992 | Jochum et al. |
| 6,183,873 | B1 | 2/2001 | Clarke |
| 6,906,117 | B2 | 6/2005 | Nowak et al. |
| 8,022,113 | B2 | 9/2011 | Klettke et al. |
| 2019/0393574 | A1 | 12/2019 | Goeb et al. |

FOREIGN PATENT DOCUMENTS

| | | | | |
|---|---|---|---|---|
| EP | 1797155 A2 | * | 6/2007 | ............... A61K 8/11 |
| EP | 1797155 B1 | | 10/2015 | |
| EP | 3570296 A1 | * | 11/2019 | ............. C08K 5/526 |
| EP | 3570296 A1 | | 11/2019 | |
| EP | 3650486 A1 | * | 5/2020 | ......... C08G 73/0213 |
| EP | 3650486 A1 | | 5/2020 | |
| JP | 2000007310 A | | 1/2000 | |
| WO | 2007097921 A1 | | 8/2007 | |
| WO | 2008156821 A1 | | 12/2008 | |
| WO | 2012062627 A1 | | 5/2012 | |
| WO | 2013046784 A1 | | 4/2013 | |
| WO | 2020095170 A1 | | 5/2020 | |
| WO | 2021090181 A1 | | 5/2021 | |

OTHER PUBLICATIONS

"3M™ Boron Nitride Cooling Fillers", 3M Advanced Materials Division, 2018, pp. 1-4.
International Search Report for PCT International Application No. PCT/IB2022/050957, dated Apr. 26, 2022, 4 pages.
Jacobson, "High-Temperature Oxidation of Boron Nitride: I, Monolithic Boron Nitride", Journal of American Ceramic Society, 1999, vol. 82, No. 02, pp. 393-398.
Lee, "Surface functionalization of boron nitride platelets via a catalytic oxidation/silanization process and thermomechanical properties of boron nitrideepoxy composites", Composites Part B, 2019, vol. 157, pp. 276-282.

* cited by examiner

*Primary Examiner* — Kelechi C Egwim

(57) ABSTRACT

A curable composition comprises oxidized boron nitride particles and a polyaziridine. Each oxidized boron nitride particle comprises a hydrated boron oxide surface layer disposed on a boron nitride core. A method of curing and a cured reaction product are also disclosed.

20 Claims, No Drawings

CURABLE COMPOSITION COMPRISING POLYAZIRIDINE AND OXIDIZED BORON NITRIDE PARTICLES, METHOD OF CURING THE SAME, AND CURED COMPOSITION

CROSS REFERENCE TO RELATED APPLICATIONS

This application is a national stage filing under 35 U.S.C. § 371 of PCT/IB2022/050957, filed Feb. 3, 2022, which claims the benefit of Provisional Application No. 63/162,069, filed Mar. 17, 2021, the disclosure of which is incorporated by reference in its/their entirety herein.

TECHNICAL FIELD

The present disclosure broadly relates curable compositions comprising polyaziridine and oxidized boron nitride particles, methods of curing the same, and cured compositions that can be made thereby.

BACKGROUND

Thermal interface materials (TIMs) are placed at the interfaces between heat sources and heat sinks to reduce the thermal resistance of those interfaces. Examples of heat sources are electric vehicle batteries during charging and discharging, electronic components such as integrated circuits (ICs) and IC packages, and electromechanical devices such as electric machines (e.g., motors). The effectiveness of such TIMs depends on their thermal conductivity, as well as intimate and conformal contact with the surfaces of the source and sink. To achieve conformal contact, TIMs typically include a polymeric component. To achieve high thermal conductivity, TIMs typically include an inorganic component. Hence, common TIMs are inorganic particle filled polymer matrix composites.

TIMs that can be used to fill spaces between components of a device to enhance thermal transfer between them are commonly known as thermally-conductive gap fillers (or simply thermal gap fillers).

SUMMARY

Many thermal gap fillers are provided as a flowable curable composition of a polymerizable material and thermal filler particles that can be dispensed into a gap between components and then polymerized. In the case of polyaziridine-based thermal gap fillers, acidic catalyst is often included to facilitate polymerization. Residual catalyst in such compositions prior to and/or after polymerization may cause deleterious effects (e.g., corrosion) to electronic components in some electronic devices over time. Advantageously, the present disclosure provides polyaziridine compositions in which the thermal filler particles also serve as the catalyst for the polyaziridine polymerization, thereby eliminating the need for added acidic catalyst and improved high-temperature stability. This is achieved due to the present inventors' discovery that oxidized boron nitride can catalyze polyaziridine polymerization.

In one aspect, the present disclosure provides a curable composition comprising: oxidized boron nitride particles, each comprising a hydrated boron oxide surface layer disposed on a boron nitride core; and a polyaziridine. In some embodiments, the hydrated boron oxide surface layer may be substantially uniform and complete. In other embodiments, the hydrated boron oxide surface layer may be non-uniform and/or incomplete.

In another aspect, the present disclosure provides a method of at least partially curing a curable composition, the method comprising heating the above-mentioned curable composition to a temperature sufficient to cause at least partial curing of the polyaziridine.

In yet another aspect, the present disclosure provides a composition comprising an at least partially cured reaction product of the above-mentioned curable composition.

As used herein, the term "aziridino group" refers to a monovalent (at nitrogen) group, optionally substituted, having the ring skeletal atoms

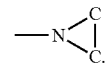

Examples include

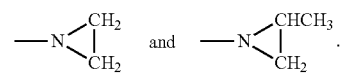

Also, as used herein:
the term "polyaziridine" refers to a compound having at least two aziridino groups;
whenever not specifically given, units of molecular weight referred to herein are grams/mole; and
the general phrase "$C_p$-$C_q$" means having p to q carbon atoms, inclusive; and
C(=O) or refers to a carbonyl group having two additional single bonds to the carbon atom.

Features and advantages of the present disclosure will be further understood upon consideration of the detailed description as well as the appended claims.

DETAILED DESCRIPTION

Curable compositions according to the present disclosure comprise oxidized boron nitride particles and at least one polyaziridine. The oxidized boron nitride particles each comprise a hydrated boron oxide surface layer disposed on a boron nitride (BN) core.

The boron nitride base may comprise any crystalline form including, for example, amorphous form (a-BN), hexagonal form (h-BN), cubic form (c-BN), Wurtzite form (w-BN), or a combination thereof. In some embodiments, hexagonal boron nitride is preferred.

Suitable oxidized boron nitride particles can be readily formed by heating boron nitride particles in air or oxidizing atmosphere to a temperature of about 800 to 900° C. to form a boron oxide layer on at least a portion (typically all) of the boron nitride particle surface, with thicker boron oxide layers formed at longer heating times. Higher temperatures may also be useful. The boron nitride particles used in the oxidation process may be blocky, flakes, platelets, and/or agglomerates.

Upon cooling at exposure to humidity in air, the boron oxide layer become hydrated thereby forming the hydrated boron oxide surface layer. In typical cases, the hydrated boron oxide layer forms a substantially uniform and complete coating over the boron nitride core; however this is not a requirement. The degree of oxidation can be controlled by changing the temperature and/or time at the temperature and the oxidizing atmospheric composition, for example.

The degree of oxidation may be any level capable of initiating aziridine polymerization optionally with heating. In some embodiments, at least 1, at least 2, at least 3, at least 4, or even at least 5 percent of boron atoms in the oxidized boron nitride particles are disposed in the hydrated boron oxide surface layer.

The oxidized boron nitride particles may have any average particle size (e.g., as determined by laser light scattering according to ISO 13320:2020 "Particle size analysis—Laser diffraction methods"), but are often in the range of 1 to 500 microns, preferably 3 to 250 microns, preferably 3 to 50 microns, more preferably 3 to 200 microns. It will be apparent that thicker hydrated boron oxide layers necessitate larger oxidized boron nitride particles. Typically, they result directly from the oxidation process; however, they may be classified or comminuted after oxidation to conform to a desired size distribution.

Useful polyaziridines comprise at least two aziridino and/or 2-alkylaziridino groups. They may be small a molecule crosslinker such as, for example, trimethylolpropane tris-(N-aziridinyl)propionate) and pentaerythritol-tris-(-(N-aziridinyl)propionate), tris[1-(2-ethyl)aziridinyl]phosphine oxide, or they be of an oligomeric or polymeric nature. Such polyaziridines may include, for example, silicone polyaziridines and polyether polyaziridines, for example. These materials have at least 2 aziridino groups attached to an oligomeric or polymeric backbone.

Exemplary prepolymer polyaziridines having an equivalent weight of at least about 100 grams/mole (g/mol) are disclosed in U.S. Pat. No. 8,022,113 B2 (Klettke et al.).

In some embodiments, the polyaziridine comprises at least one polydimethylsiloxane segment, wherein the polyaziridine comprises an α,ω-aziridino group end-capped linear silicone. Exemplary silicone-based polyaziridines include those disclosed in U.S. Pat. No. 6,906,117 B2 (Bissinger et al.) and 6,867,246 B2 (Bissinger et al.).

In some preferred embodiments, the polyaziridine comprises an α,ω-aziridino group end-capped linear silicone represented by the formula

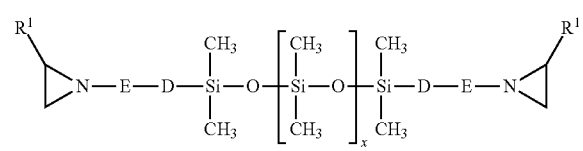

x is an integer from 1 to 10000, or from 1 to 1000, or from or from 5 to 1000, 5 to 500 or from 10 to 500, inclusive. In some embodiments, x is selected such that the calculated number average molecular weight of the polyaziridine is 1000-20000 g/mol.

Each $R^1$ independently represents H, $C_1$-$C_{12}$ alkyl, $C_2$-$C_{12}$ alkenyl, or $C_6$-$C_{12}$ aryl. Examples include H, methyl, ethyl, allyl, and phenyl.

Each D is independently selected from C(=O)O, C(=O)NR$^2$, C(=O), C(=O)C(=O)NR$^2$, C(=O)(CH$_2$)$_p$C(=O), (C=S)NR$^2$, and a covalent bond, wherein each $R^2$ independently represents H, $C_1$-$C_{12}$ alkyl, $C_2$-$C_{12}$ alkenyl, or $C_6$-$C_{12}$ aryl. Examples of $R^2$ include methyl, ethyl, propyl, butyl, pentyl, hexyl, octyl, decyl, dodecyl, allyl, and phenyl.

Each E independently represents a $C_1$-$C_{18}$ alkylene group, in some embodiments a $C_1$-$C_{12}$ alkylene group, and in some embodiments a $C_1$-$C_8$ alkylene group, which may be linear, branched, and/or cyclic. Examples of E include methylene, ethylene, propylene, butylene, hexylene, octylene, decylene, dodecylene, octadecylene, cyclohexane-1,4-diyl, and 2-buten-1,4-diyl.

In some embodiments,

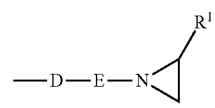

represents

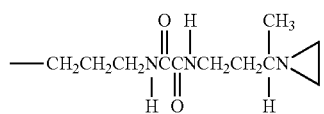

Polyaziridines of this type are described in pending application PCT/IB2020/060330 filed Nov. 4, 2020 and entitled "Thermally-Conductive Curable Composition".

Exemplary polyether-based polyaziridines are described in U.S. Pat. No. 3,453,242 (Schmitt et al.); U.S. Pat. No. 6,383,279 B1 (Eckhardt et al.); and U.S. Pat. Appl. Publ. No. 2019/0393574 (Goeb et al.).

In some embodiments, an exemplary an α,ω-aziridino group end-capped linear polyether-based polyaziridine is represented by the general formula

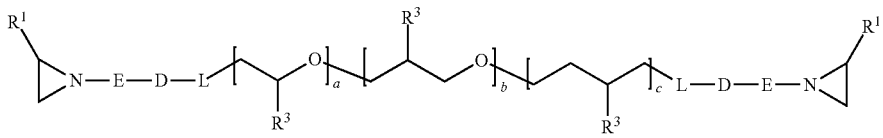

wherein:
$R^1$, $R^2$, D, and E are as previously defined;
each L is independently O or NR$^4$, wherein $R^4$ is H, $C_1$ to $C_{12}$ alkyl, $C_2$ to $C_{12}$ alkenyl, or aryl;
each $R^3$ is independently selected from H, alkyl (e.g., methyl, ethyl), substituted alkyl (e.g., chloromethyl or hydroxymethyl), and phenyl; and
a, b, and c are integers greater than or equal to zero.

While oxidized boron nitride particles can serve as thermally-conductive filler particles (i.e., thermal filler particles) in optionally curable, and hence also cured compositions, according to the present disclosure can further include (i.e., beyond the oxidized boron nitride particles) electrically-insulative and/or electrically-conductive thermally conductive filler particles.

Exemplary electrically-insulative thermally conductive particles may include particles comprising non-oxidized boron nitride, aluminum nitride, silicon nitride, aluminum oxide (alumina), magnesium oxide, zinc oxide, silicon oxide, beryllium oxide, titanium oxide, copper oxide, cuprous oxide, magnesium hydroxide, aluminum hydroxide, silicon carbide, diamond, talc, mica, kaolin, bentonite, magnesite, pyrophyllite, titanium boride, calcium titanate, and combinations thereof. Among these, from the perspectives of thermal conductivity and cost, aluminum oxide, aluminum hydroxide, zinc oxide, and aluminum nitride are generally preferred. Aluminum oxide and aluminum hydroxide are more preferred, and aluminum hydroxide is particularly preferred.

Exemplary electrically-conductive thermally conductive filler particles may include particles comprising graphite, carbon black, carbon fibers (pitch-based, PAN-based), carbon nanotubes (CNT), graphene, carbon fibers (CNF), silver, copper, iron, nickel, aluminum, titanium, alloys thereof, stainless steel (SUS), zinc oxide to which different type of element is doped, ferrites, and combinations thereof. An insulating raw material, such as silica, may be coated with an electrically conductive thermally conductive raw material to make it electrically conductive, or an electrically conductive thermally conductive raw material may be coated with an insulating raw material, such as silica, to make it insulating, and these may be used as the thermally conductive raw materials.

Thermally-conductive filler particles used herein preferably have a thermal conductivity of at least at least 2.0 W/m·K, at least 10 W/m·K, at least 20 W/m·K, at least 40 W/m·K, or even at least 50 W/m·K, although lower and higher thermal conductivities may also be used.

Thermally-conductive filler particles may have any shape; for example, spheroidal, blocky, needle-like, and/or flake/platelet shapes may be used.

Thermally-conductive filler particles may have any particle size, but preferably have a maximum dimension in the size range of 100 nanometers (nm) to 1 millimeter (mm).

In some embodiments, oxidized boron nitride particles and non-oxidized boron nitride particles are present in curable compositions according to the present disclosure in a respective weight ratio of at least 1 to 3.

Optionally, curable compositions according to the present disclosure may further comprise adjuvants such as pigments, inhibitors, accelerators, viscosity modifiers, surfactants, flow aids, and other ingredients that will be apparent to those skilled in the art. If present, they should be in amounts that do not substantially interfere with the catalytical effect of the oxidized boron nitride toward polyaziridine polymerization.

The curable compositions may comprise additional ingredients depending on the targeted applications and performance attributes. For example, in some embodiments, the curable composition further comprises at least one of a plasticizer, a flame retardant, and flame-retardant plasticizer.

In one particular aspect, the curable composition may provide flame retardancy and therefore include solid flame-retardant additives that may use intumescent materials (e.g., expandable graphite and phosphorous compounds). Other solid flame-retardant additives include aluminum hydroxide compounds (e.g., aluminum trihydroxide) and ammonium salts (e.g., ammonium tetrafluoroborate and ammonium hexafluorophosphate). Specific solid flame-retardant materials include those selected from the group consisting of an intumescent material, an aluminum hydroxide, and combinations thereof. Specifically, the intumescent material may be selected from the group consisting of phosphorus and expandable graphite.

In some embodiments, it may be beneficial to use liquid flame-retardant plasticizer such as a phosphoric acid alkyl ester. For example, useful liquid flame retardant plasticizers include those having the general formula $OP(OR^3)(OR^4)(OR^5)$, wherein each of $R^3$, $R^4$ and $R^5$ is independently selected from a $C_1$-$C_{10}$ aliphatic group (no aromatic ring) and a $C_6$-$C_{20}$ aryl group, a $C_7$-$C_{30}$ alkylaryl group, and a $C_7$-$C_{30}$ arylalkyl group. In one particularly advantageous aspect, the liquid flame-retardant plasticizer for use in the thermally-conductive curable composition of the present disclosure comprises 2-ethylhexyldiphenyl phosphate.

Alternatively, the curable composition according to the disclosure may be substantially free of (or completely free of) flame-retardant, in particular flame-retardant based on minerals, organohalogen compounds, and organophosphorus compounds.

Curable compositions according to the present disclosure can be cured by mixing the component by any suitable method, typically with moderate heating, although this is not a requirement. Heating typically ranges from about 25° C. to about 175° C., although other higher temperatures may also be used.

Curable compositions according to the present disclosure may be useful as a thermal interface material (e.g., a thermal gap filler), for example, in a battery cell assembly.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted or readily apparent from the context, all parts, percentages, ratios, etc. in the Examples and the rest of the specification are by weight. Table 1, below, reports materials and abbreviations used in the Examples.

TABLE 1

| ABBREVIATION | DESCRIPTION AND SOURCE |
| --- | --- |
| CFF 200-3 | Hexagonal boron nitride, obtained as BORON NITRIDE COOLING FILLER FLAKES CFF 200-3 from 3M Company; St. Paul, Minnesota |
| BN-800 | Hexagonal boron nitride flakes oxidized at 800° C., prepared as described hereinbelow |
| BN-900 | Hexagonal boron nitride flakes oxidized at 900° C., prepared as described hereinbelow |
| TM1250 | Aluminum oxide with a mean diameter of 1.6 micrometer, obtained as MARTOXID TM1250 from Huber Martinswerk; Bergheim, Germany |

TABLE 1-continued

| ABBREVIATION | DESCRIPTION AND SOURCE |
|---|---|
| BAK10 | Spherical Aluminum oxide with a mean diameter of 10 micrometer, obtained as BAK10 from Bestry; Sichuan, China |
| BAK70 | Spherical Aluminum oxide with a mean diameter of 70 micrometer, obtained as BAK70 from Bestry |
| DB-108 | Hydroxy-functional carboxylic acid ester obtained as DISPERBYK-108 from BYK Chemistry; Wesel, Germany |
| AZISI | Bis[3-ethyleniminopropylamido-oxalamidopropyl-(dimethylsiloxy])-polydimethylsiloxane) having a number average molecular weight of about 3000 g/mol, prepared generally according to procedures in pending application PCT/IB2020/060330 filed Nov. 4, 2020 and entitled "Thermally-Conductive Curable Composition" |
| AZPE-4 | Propylene-glycol bisaziridino-functional oligomer having a number average molecular weight of about 4400 g/mol, obtained from 3M Company, prepared generally according to procedures in U.S. Pat. No. U.S. Pat. Appl. Publ. No. 2019/0393574 A1 (Bissinger et al.) |
| TEHABS | Tris(2-ethylhexyl)ammonium alkyl($C_{11}$-$C_{13}$)benzenesulfonate, prepared according to the general method disclosed in PCT Publ. No. WO 2020-095170 A1 (Bissinger et al.) |

Preparation of Oxidized BN Flakes (BN-800 and BN-900)

Hexagonal boron nitride flakes of the type CFF 200-3 were weight as loose filling into a fused silica crucible and placed into a cold conventional 1100° C.-furnace/kiln (Nabertherm). The oven temperature was set to 800 or 900° C. in ambient atmosphere (heating up took 3 to 4 h) and the temperature was hold for 3 h. Cooling down of the filler to room temperature took place in the turned-off closed oven at ambient atmosphere and took 12 to 15 h. The conversion rate of boron nitride that was converted to $B_2O_3$ was calculated based on the determined weight gains after heat treatment.

TABLE 2

| FILLER | WEIGHT GAIN AFTER OXIDATION, % | CONVERSION RATE, % (BN to B2O3) | OVEN TEMPERATURE |
|---|---|---|---|
| BN-800 | 0.083 | 0.21 | 800 |
| BN-900 | 2.3 | 5.75 | 900 |

Test Method 1: Scanning Electron Microscopy (SEM) with Energy Dispersive X-Ray Analysis (EDX)

The powder samples were evaluated using a scanning electron microscope (SEM) (obtained as PHENOM PROX from Thermo Fischer Scientific, Waltham, Massachusetts). The boron nitride powder was applied in a thin layer on the carbon adhesive pad and then analyzed without applying an additional conductive coating. Instead, the acceleration voltage was set to 5 kV to prevent surface charging. Pictures were taken using the back-scatter-electron (BSE) mode and elemental analysis taken using the energy dispersive detector (EDX) of the characteristic X-ray diffraction. A Phenom Pro Suite software EDS element (Thermo Fischer Scientific) was used for elemental mapping analysis in order to gain average elemental content as well as local distribution with a 32×32 measurement points for the full-scale picture. The results are reported in Table 3, below.

TABLE 3

| FILLER | SEM-EDX Nitrogen, Atomic weight % | Oxygen, Atomic weight % |
|---|---|---|
| CFF 200-3 | 95.1 | 1.3 |
| BN-800 | 98.3 | 1.7 |
| BN-900 | 89.1 | 10.9 |

Test Method 2: Acidity of Oxidized Boron Nitride Flakes by pH Measurements

The acidity of the oxidized BN samples was studied by testing with pH indicator paper. Therefore, 0.5 g of boron nitride was dispersed in 4.5 mL of deionized water and stirred for 4 h at room temperature. The boron nitride was filtered off and the resulting filtrate was dropped on pH paper. After 30 s, the colors on the test stripes were compared to the color scheme on the indicator packaging. Two different types of indicator paper were used: 1) MQuant, non-bleeding, pH-range: 0-14, accuracy: 1 pH, Merck, Darmstadt, Germany; 2) MQuant, non-bleeding, pH-range: 0-6.0, accuracy: 0.5 pH, Merck. The results are reported in Table 4, below.

TABLE 4

| | pH | |
|---|---|---|
| Filler Sample | Indicator pH 0-14 (1.0 pH unit) | Indicator pH 0-6.0 (0.5 pH unit) |
| CFF 200-3 | 6 | 6.0 |
| BN-800 | 6 | 6.0 |
| BN-900 | 5 | 5.0 |

Example 1

Example 1 was prepared by mixing 2.86 g of AZISI and 0.22 g DB-108 in a high shear mixer (obtained as DAC SPEEDMIXER 400.2 VAC-P from Hauschild, Hamm, Germany) at 2500 rpm for 30 s. Afterward, alumina fillers were added consecutively in the following order: 4.19 g of TM1250, 4.19 g of BAK10, 12.56 g of BAK70. After each filler addition, the container was mixed at 2500 rpm for 30 s. After the mixture was cooled down to room temperature, it was further mixed under reduced pressure of 50 mbar (5.0 kPa) at 1000 rpm for 2 min. BN-800 (1.00 g) was added to the cooled down mixture and it was again mixed at 2500 rpm for 30 s. Immediately after mixing, the samples were further processed.

Examples 2-7 and Comparative Examples A-B

Examples 2-7 and Comparative Example A were prepared generally as described in Example 1, except using the compositions reported in Table 5. For Comparative Example B, 0.06 g TEHABS was added together with CFF200-3.

TABLE 5

| COMPONENT | Comp. Ex. A | Comp. Ex. B | 1 | 2 | 3 | 4 | 5 | 6 | 7 |
|---|---|---|---|---|---|---|---|---|---|
| AZISI, grams | 2.86 | 2.86 | 2.86 | 2.86 | 2.86 | 2.86 | 2.86 | 2.86 | 2.86 |
| DB-108, grams | 0.22 | 0.22 | 0.22 | 0.22 | 0.22 | 0.22 | 0.22 | 0.22 | 0.22 |
| TM1250, grams | 4.19 | 4.19 | 4.19 | 4.19 | 4.19 | 4.19 | 4.19 | 4.19 | 4.19 |
| BAK 10, grams | 4.19 | 4.19 | 4.19 | 4.19 | 4.19 | 4.19 | 4.19 | 4.19 | 4.19 |
| BAK 70, grams | 12.56 | 12.56 | 12.56 | 12.56 | 12.56 | 12.56 | 12.56 | 12.56 | 12.56 |
| CFF 200-3, grams | 1.00 | 1.00 | — | 0.40 | — | 0.25 | 0.40 | 0.50 | 0.75 |
| BN-800, grams | — | — | 1.00 | 0.60 | — | — | — | — | — |
| BN-900, grams | — | — | — | — | 1.00 | 0.75 | 0.60 | 0.50 | 0.25 |
| TEHABS, grams | — | 0.06 | — | — | — | — | — | — | — |

Procedure for Curing and Storage Stability Tests

The reactivity of the composites prepared by the method described above were tested by checking the viscosity and hardness of the composites after ageing of the samples under different conditions. The samples were either placed in closed containers in a convection oven or in the refrigerator that were set to the denoted temperature. For the test under "ambient conditions", the sample was left on the laboratory bench (average temperature between 18-23° C.). The degree of curing of the samples were classified as "no cure" (no obvious change in viscosity), "very soft" (small increase in viscosity), "soft" (large increase in viscosity, but still a paste), "cured" (not a paste, but changed shape under small pressure) and "cured (hard)" (cured material, did not change shape under small pressure). The results are shown in Tables 6 and 7, below.

TABLE 6

| CURE CONDITIONS | Comp. Ex. B | 1 | 2 | 3 | 5 |
|---|---|---|---|---|---|
| 150° C., 5 min | Cured (hard) | No cure | No cure | Cured (hard) | Cured |
| 150° C., 15 min | Cured (hard) | No cure | No cure | Cured (hard) | Cured (hard) |
| 150° C., 45 min | Cured (hard) | No cure | No cure | Cured (hard) | Cured (hard) |
| Ambient conditions, 3 d | Cured | No cure | No cure | Cured (hard) | Cured |
| 7° C., 3 d | Cured | No cure | No cure | Cured | Soft |
| −29° C., 3 d | Cured | No cure | No cure | Soft | Very Soft |
| −40° C., 3 d | Cured | No cure | No cure | Soft | No cure |

TABLE 7

| CURE CONDITIONS | 3 | 4 | 6 | 7 | Comp. Ex. A |
|---|---|---|---|---|---|
| 60° C., 30 min | Soft | No cure | No cure | No cure | No cure |
| 80° C., 30 min | Cured | Soft | No cure | No cure | No cure |
| 150° C., 30 min | Cured (hard) | Cured | Soft | Very soft | No cure |
| 175° C., 30 min | Cured (hard) | Cured | Soft | Very soft | No cure |

Examples 8-11 and Comparative Example C

Examples 8-11 and Comparative Example C were prepared by first mixing the boron nitride fillers in the denoted ratios giving a total weight of 2.00 g. Then 6.00 g AZPE-4 was added and the mixture was mixed in a high shear mixer (obtained under the trade designation "DAC SPEEDMIXER 400.2 VAC-P" from Hauschild) at 2500 rpm for 30 s. It was further mixed under reduced pressure of 50 mbar at 1000 rpm for 2 min. Immediately after mixing, the samples were further processed. The compositions are reported in Table 8, below.

TABLE 8

| COMPONENT | Comp. Ex. C | 8 | 9 | 10 | 11 |
|---|---|---|---|---|---|
| AZPE-4, grams | 6.00 | 6.00 | 6.00 | 6.00 | 6.00 |
| CFF 200-3, grams | 2.00 | — | 0.50 | 1.00 | 1.50 |
| BN-900, grams | — | 2.00 | 1.50 | 1.00 | 0.50 |

Procedure for Curing Tests (Examples 8-11 and Comp. Ex. C)

The reactivity of the composites prepared by the method described above were tested by checking the viscosity and hardness of the composite after ageing of the samples under different conditions. The samples were placed in a closed container in a convection oven that was set to the denoted temperature. The degree of curing of the samples were classified as "no cure" (no obvious change in viscosity), "very soft" (small increase in viscosity), "soft" (large increase in viscosity, but still a paste), "cured" (not a paste, but changed shape under small pressure) and "cured (hard)" (cured material, did not change shape under small pressure). The results are reported in Table 9, below.

TABLE 9

| | EXAMPLE | | | | |
|---|---|---|---|---|---|
| CONDITIONS | 8 | 9 | 10 | 11 | Comp. Ex. C |
| 60° C., 30 min | Cured | Soft | Very soft | Very soft | No cure |
| 80° C., 30 min | Cured (hard) | Cured | Soft | Very soft | No cure |
| 150° C., 30 min | Cured (hard) | Cured (hard) | Cured | Soft | No cure |
| 175° C., 30 min | Cured (hard) | Cured (hard) | Cured | Soft | No cure |

Test Method 3: Thermal Conductivity by Laser Flash Analysis

Thermal conductivity measurements were performed using a laser flash analysis apparatus (obtained as "LFA 467 Hyperflash" from Netzsch, Selb, Germany) according to ASTM E1461-13 entitled "Standard Test Method for Thermal Diffusivity by the Flash Method." Samples of ca. 1 mm thickness were prepared by coating of the uncured material between two fluorinated PET release liners (FILMBYNA YB2, Fujimori Kogyo, Tokyo, Japan) with a knife coater and curing at room temperature for 1 d. The samples were then cut into 10 mm×10 mm squares with a knife cutter to fit in the sample holder. Before measurement, samples were coated with a thin layer of graphite (GRAPHIT 33, Kontakt Chemie, Iffezheim, Germany) on both sides. In a measurement, the temperature of the top side of the sample is measured by an InSb IR detector after irradiation of a pulse of light (Xenon flash lamp, 230 V, 20-30 microseconds duration) to the bottom side. Diffusivity is then calculated from a fit of the thermogram by using the Cowan method. Six measurements were done for each sample at 23° C. For each formulation, three samples were prepared and measured. The thermal conductivity was calculated from the thermal diffusivity, density and specific heat capacity of each sample.

Test Method 4: Shore D Hardness

Samples of ca. 1 mm thickness were prepared by coating of the uncured material between two fluorinated PET release liners (FILMBYNA YB2, Fujimori Kogyo, Tokyo, Japan) with a knife coater and curing at room temperature for 1 d. The liner was removed, and the Shore D hardness of the as-prepared films was determined according to ASTM 2240-00 "Standard Test Method for Rubber Property—Durometer Hardness".

TABLE 10

| | COMPARATIVE EXAMPLE B 100% CFF 200-3 + TEHABS | EXAMPLE 3 100% BN-900 |
|---|---|---|
| Thermal Conductivity, W/m · K | 3.9 | 3.8 |
| Shore D hardness | 61 | 62 |

All cited references, patents, and patent applications in this application are incorporated by reference in a consistent manner. In the event of inconsistencies or contradictions between portions of the incorporated references and this application, the information in this application shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising:
    oxidized boron nitride particles, each comprising a hydrated boron oxide surface layer disposed on a boron nitride base; and
    a polyaziridine.
2. The curable composition of claim 1, wherein at least 3 percent of boron atoms in the oxidized boron nitride particles are disposed in the hydrated boron oxide surface layer.
3. The curable composition of claim 1, wherein at least 4 percent of boron atoms in the oxidized boron nitride particles are disposed in the hydrated boron oxide surface layer.
4. The curable composition of claim 1, wherein at least 5 percent of boron atoms in the oxidized boron nitride particles are disposed in the hydrated boron oxide surface layer.
5. The curable composition of claim 1, wherein the boron nitride base comprises hexagonal boron nitride.
6. The curable composition of claim 1, wherein the polyaziridine comprises at least one polydimethylsiloxane segment.
7. The curable composition of claim 1, wherein the polyaziridine comprises a polyether-based polyaziridine.
8. The curable composition of claim 1, wherein the polyaziridine comprises an $\alpha,\omega$-aziridino group end-capped linear polyether polymer.
9. The curable composition of claim 1, further comprising non-oxidized boron nitride particles, wherein the oxidized boron nitride particles and non-oxidized boron nitride particles are present in a respective weight ratio of at least 1 to 3.
10. A method of at least partially curing a curable composition, the method comprising heating the curable composition of claim 1 to a temperature sufficient to cause at least partial curing.
11. The method of claim 10, wherein the temperature is less than or equal to 175 degrees Celsius.
12. A composition comprising an at least partially cured reaction product of the curable composition of claim 1.
13. The curable composition of claim 2, wherein the boron nitride base comprises hexagonal boron nitride.
14. The curable composition of claim 3, wherein the boron nitride base comprises hexagonal boron nitride.
15. The curable composition of claim 4, wherein the boron nitride base comprises hexagonal boron nitride.
16. The curable composition of claim 2, wherein the polyaziridine comprises at least one polydimethylsiloxane segment.
17. The curable composition of claim 3, wherein the polyaziridine comprises at least one polydimethylsiloxane segment.
18. The curable composition of claim 4, wherein the polyaziridine comprises at least one polydimethylsiloxane segment.
19. The curable composition of claim 5, wherein the polyaziridine comprises at least one polydimethylsiloxane segment.
20. The curable composition of claim 2, wherein the polyaziridine comprises a polyether-based polyaziridine.

* * * * *